(12) United States Patent
Kim et al.

(10) Patent No.: US 9,196,892 B2
(45) Date of Patent: Nov. 24, 2015

(54) RECHARGEABLE BATTERY

(71) Applicant: SAMSUNG SDI CO., LTD., Yongin-si, Gyeonggi-do (KR)

(72) Inventors: Duk-Jung Kim, Yongin-si (KR); Min-Hyung Guen, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 287 days.

(21) Appl. No.: 13/864,163

(22) Filed: Apr. 16, 2013

(65) Prior Publication Data

US 2014/0141319 A1    May 22, 2014

(30) Foreign Application Priority Data

Nov. 20, 2012    (KR) ........................ 10-2012-0131865

(51) Int. Cl.
*H01M 2/30* (2006.01)
*H01M 2/32* (2006.01)
*H01M 2/04* (2006.01)
*H01M 10/04* (2006.01)

(52) U.S. Cl.
CPC ................ *H01M 2/32* (2013.01); *H01M 2/043* (2013.01); *H01M 2/305* (2013.01); *H01M 10/0413* (2013.01); *H01M 10/0431* (2013.01); *H01M 2/0486* (2013.01); *H01M 2200/30* (2013.01)

(58) Field of Classification Search
CPC .................................. H01M 2/30; H01M 2/32
USPC .................................................. 429/179, 208
See application file for complete search history.

(56) References Cited

U.S. PATENT DOCUMENTS

| 2006/0024578 A1* | 2/2006 | Lee ............................... 429/208 |
| 2010/0173190 A1 | 7/2010 | Tsuchiya |
| 2010/0279156 A1 | 11/2010 | Kim et al. |
| 2011/0311863 A1 | 12/2011 | Byun et al. |
| 2012/0021277 A1 | 1/2012 | Byun et al. |

FOREIGN PATENT DOCUMENTS

| EP | 2 299 512 A1 | 3/2011 |
| EP | 2 490 282 A1 | 8/2012 |
| KR | 10-2008-0009462 A | 1/2008 |
| KR | 10-1084056 B1 | 11/2011 |
| KR | 10-2011-0137005 A | 12/2011 |

OTHER PUBLICATIONS

EPO Search Report dated Feb. 21, 2014, for corresponding European Patent application 13170669.9, (5 pages).

* cited by examiner

*Primary Examiner* — Kenneth Douyette
*Assistant Examiner* — James Lee
(74) *Attorney, Agent, or Firm* — Christie, Parker & Hale, LLP

(57) ABSTRACT

A rechargeable battery includes: an electrode assembly configured to perform charging and discharging; a case enclosing the electrode assembly; a cap plate coupled to an opening of the case; an electrode terminal engaging a terminal hole of the cap plate; and an insulator between the cap plate and the electrode terminal, wherein the insulator comprises: a fluid receiving recess at a side of the electrode terminal to receive fluid, and an outlet extending through the insulator from the fluid receiving recess to discharge the received fluid.

16 Claims, 4 Drawing Sheets

RECHARGEABLE BATTERY

CROSS-REFERENCE TO RELATED APPLICATION

This application claims priority to and the benefit of Korean Patent Application No. 10-2012-0131865 filed in the Korean Intellectual Property Office on Nov. 20, 2012, the entire contents of which are incorporated herein by reference.

BACKGROUND

1. Field

The described technology relates generally to a rechargeable battery.

2. Description of the Related Art

A rechargeable battery is a battery configured to be repeatedly charged and discharged, which is different from a primary battery. Small capacity rechargeable batteries are often used in portable and small electronic devices, such as mobile phones, notebook computers, and camcorders. Large capacity rechargeable batteries may be used as a power source for driving a motor of a hybrid car or an electric car.

Electrolyte fluids of rechargeable batteries, however, may permeate into internal spaces that are intended to be isolated from the electrolyte fluid, due to limitations in the performance and design of internal sealing materials. As a result, an electrode terminal may be corroded.

The above information disclosed in this Background section is only for enhancement of understanding of the background of the described technology and therefore it may contain information that does not form the prior art that is already known in this country to a person of ordinary skill in the art.

SUMMARY

The described technology has been made in an effort to provide a rechargeable battery which prevents or reduces electrolyte fluid from permeating into a space between the electrode terminal and a cap plate from the outside.

An exemplary embodiment provides a rechargeable battery, including: an electrode assembly configured to perform charging and discharging; a case enclosing the electrode assembly; a cap plate coupled to an opening of the case; an electrode terminal engaging a terminal hole of the cap plate; and an insulator between the cap plate and the electrode terminal, wherein the insulator comprises: a fluid receiving recess at a side of the electrode terminal to receive fluid, and an outlet extending through the insulator from the fluid receiving recess to discharge the received fluid.

The fluid receiving recess may be formed adjacent to a periphery of the electrode terminal, and the outlet may include first and second outlets at opposing ends of the cap plate in a longitudinal direction of the cap plate.

The electrode terminal may include: a rivet terminal in the terminal hole; and a plate terminal coupled to the rivet terminal and at an external surface of the cap plate, and the insulator may be between the plate terminal and the cap plate, and surround a periphery of the plate terminal.

The fluid receiving recess may be around a periphery of the plate terminal.

The plate terminal may include a first receiving recess in a surface facing the insulator, and the insulator may include a first wall in the first receiving recess.

The cap plate may include a second receiving recess in a surface facing the insulator, and the insulator may include a second wall in the second receiving recess.

The electrode terminal may include a cathode terminal and an anode terminal, the anode terminal may be electrically coupled to the cap plate, and the cathode terminal and the cap plate may further include an external short part therebetween.

The external short part may include: a short protrusion extending from the plate terminal and facing a short hole at the cap plate; and a short member installed at the short hole while facing the short protrusion.

The first receiving recess may include: a first receiving recess adjacent to an outer side of a rivet terminal of the cathode terminal; and a second receiving recess adjacent to the short protrusion.

The first wall may include: a first wall coupled to the first receiving recess; and a second wall coupled to the second receiving recess.

The second receiving recess and the second wall may be adjacent to the rivet terminal of the cathode terminal.

The electrode terminal may include a cathode terminal and an anode terminal, and the insulator may include: a first insulator between the cathode terminal and the cap plate and surrounding a periphery of a plate terminal of the cathode terminal; and a second insulator between the anode terminal and the cap plate and surrounding a periphery of a plate terminal of the anode terminal.

The fluid receiving recess may include: a first fluid receiving recess around a periphery of the plate terminal of the cathode terminal; and a second fluid receiving recess around a periphery of the plate terminal of the anode terminal.

The first receiving recess may include: a first receiving recess at the plate terminal of the cathode terminal facing the first insulator; and a second receiving recess at the plate terminal of the anode terminal facing the second insulator.

The first wall may include: a first wall of the first insulator in the first receiving recess; and a second wall of the second insulator in the second receiving recess.

The second receiving recess may include: a third receiving recess in a surface of the cap plate facing the first insulator; and a fourth receiving recess in a surface of the cap plate facing the second insulator.

The second wall may include: a third wall of the first insulator in the third receiving recess; and a fourth wall formed of the second insulator in the fourth receiving recess.

According to the exemplary embodiment, the fluid receiving recess and the outlet are included in the insulator installed between the electrode terminal and the cap plate, so that the electrolyte fluid entering from the outside is induced in the fluid receiving recess and is discharged through the outlet, thereby achieving an effect of preventing or reducing the electrolyte fluid from permeating therein. Accordingly, it is possible to prevent or reduce the electrode terminal installed at the terminal hole of the cap plate from being corroded.

DETAILED DESCRIPTION

Figure 1:
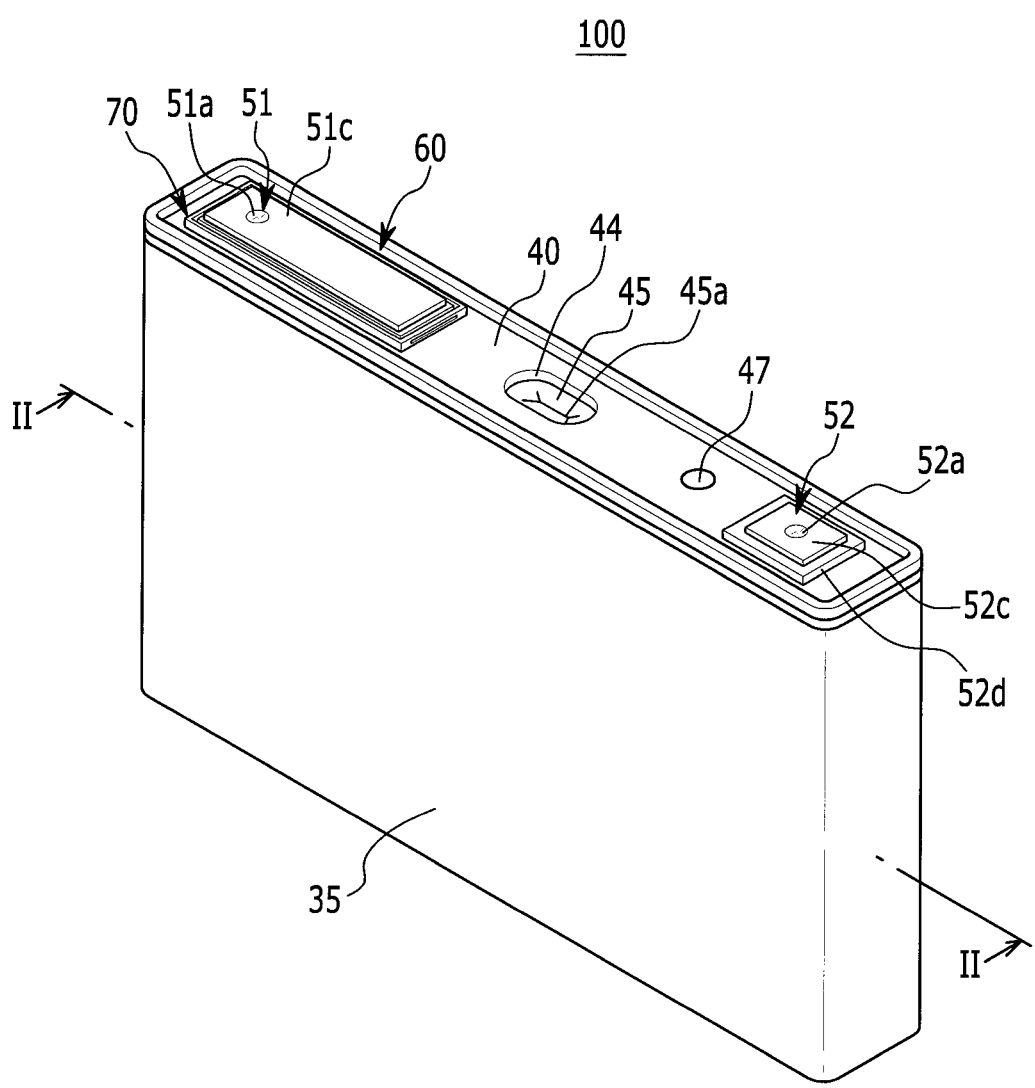
FIG. 1 is a schematic perspective view of a rechargeable battery according to a first exemplary embodiment of the present invention.

Hereinafter, the present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Throughout the specification, like reference numerals designate like elements throughout the specification.

A rechargeable battery includes an electrode assembly including electrodes at both surfaces of a separator, a case for accommodating the electrode assembly, and a cap plate coupled to an opening of the case, and an electrode terminal installed in the cap plate to be connected to the electrode through a lead tab.

For example, the electrode terminal includes a rivet terminal positioned in an inner side of the cap plate and a terminal hole to be electrically connected to the lead tab, and a plate terminal included outside the cap plate to be connected to the rivet terminal.

A gasket is interposed between the rivet terminal and the terminal hole, and an insulator is interposed between the plate terminal and the cap plate, to seal a space between the electrode terminal and the terminal hole and electrically insulate the electrode terminal and the cap plate.

Figure 2:
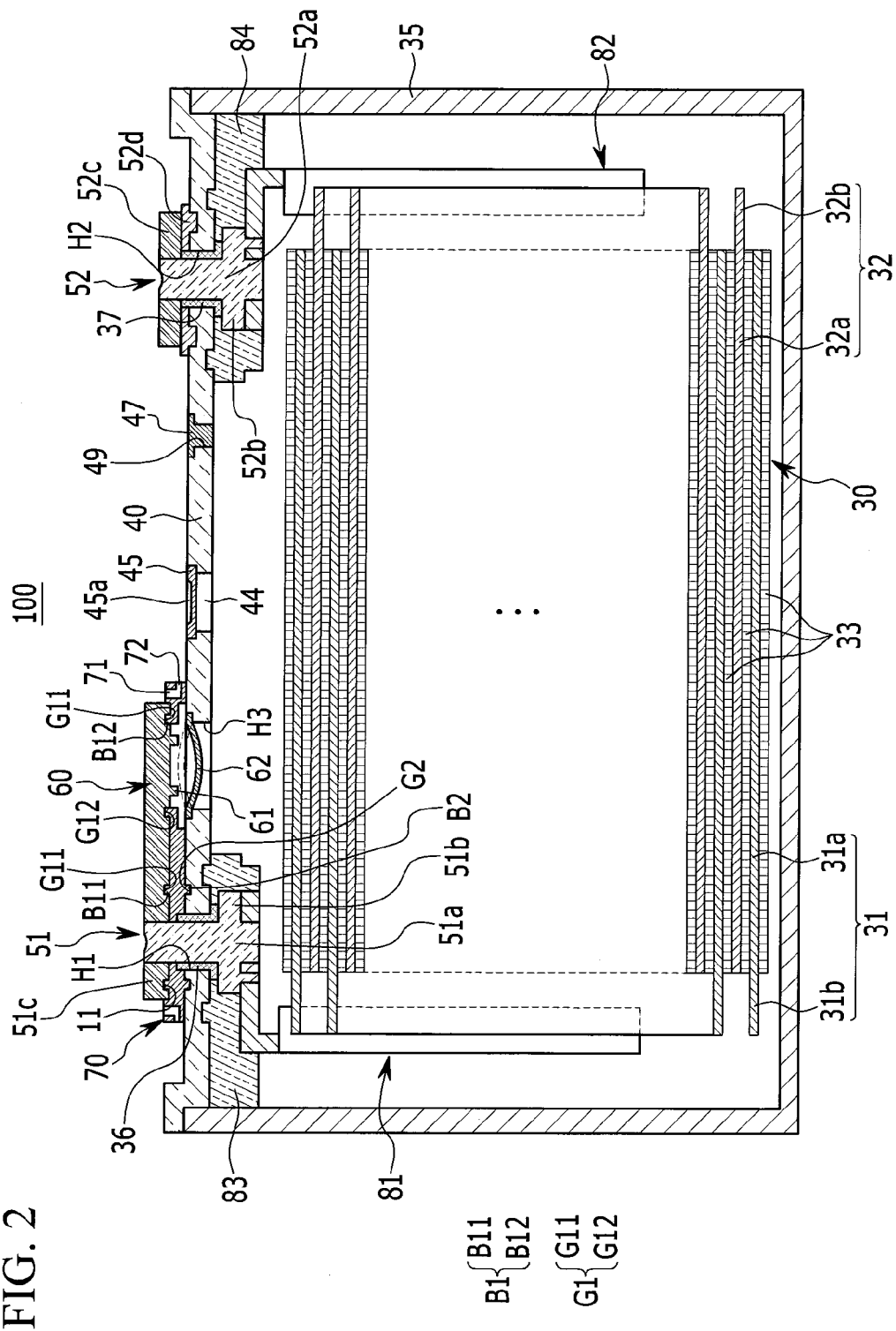
FIG. 2 is a schematic cross-sectional view taken along line II-II of FIG. 1.

FIG. 1 is a schematic perspective view of a rechargeable battery 100 according to a first exemplary embodiment of the present invention, and FIG. 2 is a schematic cross-sectional view taken along line II-II of FIG. 1.

Referring to FIGS. 1 and 2, the rechargeable battery 100 of the first exemplary embodiment includes an electrode assembly 30 for charging and discharging current, a case 35 surrounding (e.g., enclosing or accommodating) the electrode assembly 30, a cap plate 40 coupled to an opening of the case 35, a first electrode terminal 51 (hereinafter, referred to as a "cathode terminal") and a second electrode terminal 52 (hereinafter, referred to as an "anode terminal") installed in the cap plate 40, an external short part 60 included at a side of the cathode terminal 51, and an insulator 70 installed between the cathode terminal 51 and the cap plate 40.

For example, the electrode assembly 30 may be formed by positioning a first electrode 31 (hereinafter, referred to as a "cathode") and a second electrode 32 (hereinafter, referred to as an "anode") at opposing surfaces of the separator 33. The separator 33 is an insulating material. The cathode 31, the separator 33, and the anode 32 are wound or rolled together to form the electrode assembly 30.

The cathode 31 and the anode 32 include coated portions 31a and 32a formed by coating or depositing an active material on a current collector of a metal plate, and uncoated or exposed portions 31b and 32b formed as a current collector on which the active material is not coated or deposited, respectively.

The uncoated portion 31b of the cathode 31 is formed at one end of the cathode 31 along the wound cathode 31. The uncoated portion 32b of the anode 32 is formed at the other end of the anode 32 along the wound anode 32. The uncoated portions 31b and 32b are located at opposing ends of the electrode assembly 30, respectively.

For example, the case 35 is formed in an approximate cuboid so as to set a space for accommodating the electrode assembly 30 and an electrolyte solution therein, an opening for joining an outside space to an inside space is formed at one surface of the cuboid. The opening may permit the electrode assembly 30 to be inserted into the case 35.

The cap plate 40 is installed at the opening of the case 35 to substantially seal the case 35. The case 35 and the cap plate 40 may be formed of aluminum, to facilitate welding of the case 35 to the cap plate 40.

Further, the cap plate 40 includes an electrolyte injection opening 49, a vent hole 44, and terminal holes H1 and H2. The electrolyte injection opening 49 permits the electrolyte solution to be injected into the case 35 after the cap plate 40 is coupled to the case 35. After injecting the electrolyte solution, the electrolyte injection opening 49 is sealed with a sealing stopper 47.

The vent hole 44 is sealed with a vent plate 45 so as to discharge internal pressure of the rechargeable battery 100. When the internal pressure of the rechargeable battery 100 reaches predetermined pressure, the vent plate 45 is incised to open the vent hole 44. The vent plate 45 has a notch 45a for inducing the incision.

The cathode terminal 51 and the anode terminal 52 are installed at the terminal holes H1 and H2 of the cap plate 40, and are electrically coupled to the electrode assembly 30. That is, the cathode terminal 51 is electrically coupled to the cathode 31 of the electrode assembly 30, and the anode terminal 52 is electrically coupled to the anode 32 of the electrode assembly 30. Accordingly, the electrode assembly 30 is coupled to the outside of the case 35 through the cathode terminal 51 and the anode terminal 52.

The cathode terminal 51 and the anode terminal 52 are formed to have a similar structure or shape inside the cap plate 40, so that the same structure will be described together. However, the cathode terminal 51 and the anode terminal 52 are formed to have different structures or shapes outside the cap plate 40, so that the different structures will be separately described.

The cathode and anode terminals 51 and 52 include rivet terminals 51a and 52a installed at or inserted into the terminal holes H1 and H2 of the cap plate 40, respectively. Flanges 51b and 52b are wider than rivet terminals 51a and 52a, respectively, and may be integrally formed with the respective rivet terminal 51a and 52a and enclosed by the cap plate 40 and the case 35. Plate terminals 51c and 52c are formed externally with respect to the case 35 and the cap plate 40, and may be coupled to the rivet terminals 51a and 52a by riveting or welding.

Cathode and anode gaskets 36 and 37 are installed between the rivet terminals 51a and 52a of the cathode and anode terminals 51 and 52 and internal surfaces of the terminal holes H1 and H2 of the cap plate 40, respectively, to substantially seal and electrically insulate spaces between the rivet terminals 51a and 52a of the cathode and anode terminals 51 and 52 and the cap plate 40.

The cathode and anode gaskets 36 and 37 further extend between the flanges 51b and 52b and the internal surface of the cap plate 40 to further seal and electrically insulate the spaces between the flanges 51b and 52b and the cap plate 40. That is, the cathode and anode gaskets 36 and 37 prevent or reduce the electrolyte solution from being leaked through the terminal holes H1 and H2 after installing the cathode and anode terminals 51 and 52 in the cap plate 40.

Cathode and anode lead tabs 81 and 82 electrically couple the cathode and anode terminals 51 and 52 to the cathode and the anode 31 and 32 of the electrode assembly 30. That is, the cathode and anode lead tabs 81 and 82 are coupled to lower ends of the rivet terminals 51a and 52a while being supported by the flanges 51b and 52b by coupling the cathode and anode lead tabs 81 and 82 to the lower ends of the rivet terminals 51a and 52a and caulking the lower ends.

Cathode and anode insulating members 83 and 84 are installed between the cathode and anode lead tabs 81 and 82 and the cap plate 40 to electrically insulate the cathode and anode lead tabs 81 and 82 and the cap plate 40. Further, one side of each of the cathode and anode insulating members 83 and 84 is coupled to the cap plate 40, and the other side of each of the cathode and anode insulating members 83 and 84 surrounds the cathode and anode lead tabs 81 and 82, the rivet terminals 51a and 52a, and the flanges 51b and 52b, to provide increased stability to a structure of the cathode and anode lead tabs 81, the rivet terminals 51a and 52a, and the flanges 51b and 52b.

In the meantime, a top plate 52d will be described in relation to a plate terminal 52c of the anode terminal 52, and the external short part 60 will be described in relation to the plate terminal 52c of the cathode terminal 51.

The top plate 52d in the anode terminal 52 electrically couples the plate terminal 52c and the cap plate 40. For example, the top plate 52d is interposed between the plate terminal 52c and the cap plate 40, and permits a rivet terminal 52a to pass through.

Accordingly, the top plate 52d and the plate terminal 52c are coupled to an upper end of the rivet terminal 52a by coupling the top plate 52d and the plate terminal 52c to the upper end of the rivet terminal 52a and caulking the upper end. The plate terminal 52c is installed outside the cap plate 40 with the top plate 52d interposed therebetween.

The anode gasket 37 further extends between the rivet terminal 52a and the top plate 52d. That is, the anode gasket 37 prevents the rivet terminal 52a and the top plate 52d from being directly electrically coupled to each other. That is, the top plate 52d is electrically coupled to the rivet terminal 52a through the plate terminal 52c.

As described above, the anode terminal 52 is electrically coupled to the cap plate 40 to charge the cap plate 40 and the case 35 with the anode. The cathode terminal 51 is electrically insulated or isolated from the cap plate 40 by interposing the insulator 70 therebetween.

Figure 3:
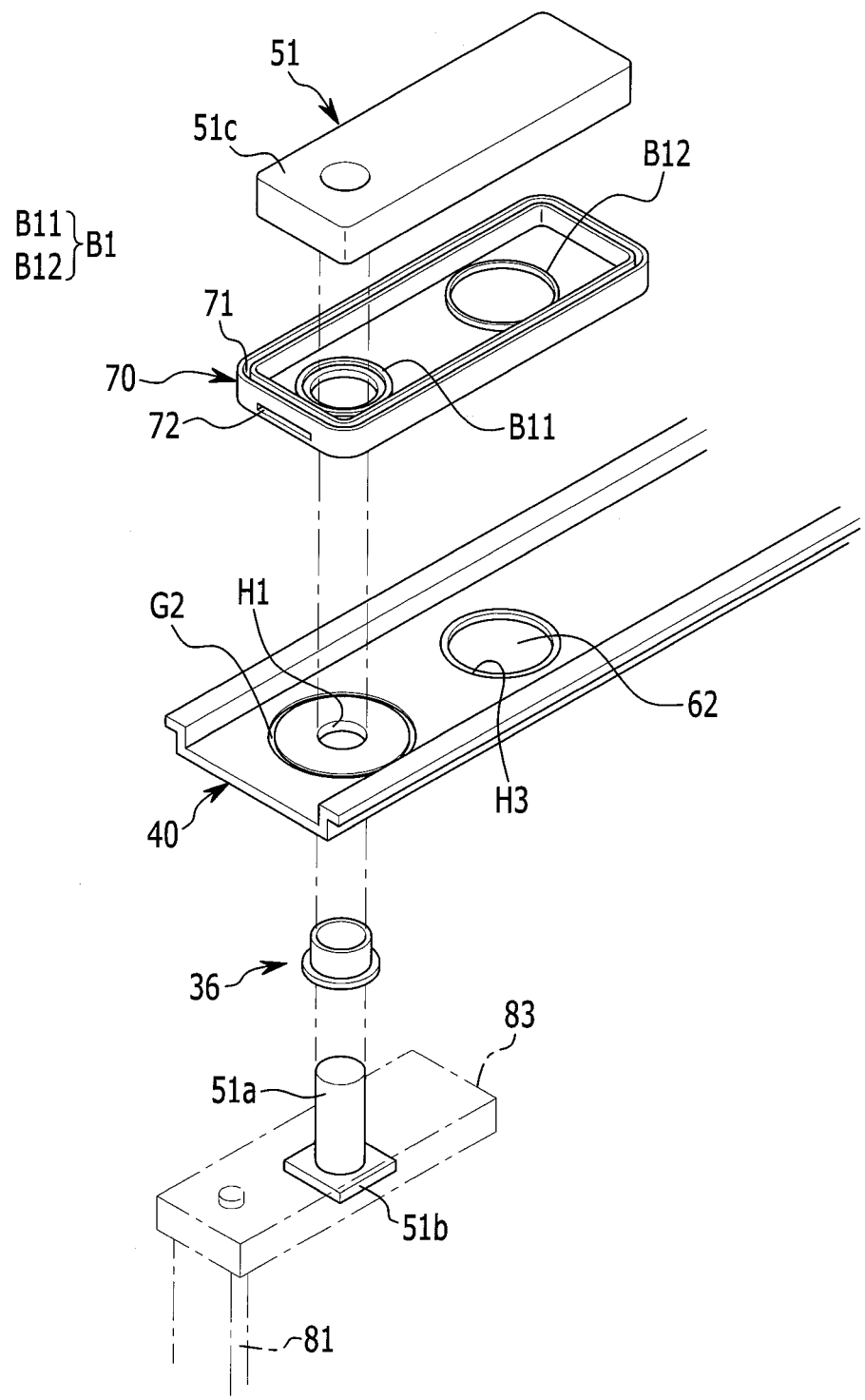
FIG. 3 is a schematic exploded perspective view of a cathode terminal side.

FIG. 3 is an exploded perspective view of a side of the cathode terminal 51. Referring to FIGS. 2 and 3, the insulator 70 is located between the plate terminal 51a and the cap plate 40, and surrounds an outer side of the plate terminal 51c. The insulator 70 includes a fluid receiving recess 71 and an outlet 72.

The fluid receiving recess 71 is adjacent to a side of the cathode terminal 51 so as to induce and receive electrolyte fluid, for example, moisture, entering from the outside. The outlet 72 is connected from the fluid receiving recess 71 to the outside to discharge the received fluid to the outside of the insulator 70.

The fluid receiving recess 71 is formed adjacent to an outer circumference of the cathode terminal 51, and particularly, is formed at a border surrounding the outer side or along a periphery of the plate terminal 51c. The outlet 72 may be formed at both sides in a longitudinal direction of the cap plate 40 (left and right directions of FIG. 2).

The cathode terminal 51 is electrically insulated from the cap plate 40 by the insulator 70, but may be electrically shorted with the cap plate 40 through the external short part 60.

In order to form the external short part 60, the cap plate 40 includes a short hole H3 under the cathode terminal 51, and the plate terminal 51c of the cathode terminal 51 is formed so as to extend in a direction of the short hole H3 away from the cap plate 40.

The external short part 60 includes a short protrusion 61 and a short member 62 separated or shorted according to internal pressure. The short protrusion 61 is formed at the plate terminal 51c, so that the short protrusion 61 is separated or vertically offset with respect to the cap plate 40 by the insulator 70 and is therefore electrically insulated from the cap plate 40 by maintaining a state in which the short protrusion 61 is separated from the short member 62. Accordingly, the cap plate 40 maintains a state in which the cap plate 40 is electrically insulated from the cathode terminal 51.

For example, the short protrusion 61 downwardly protrudes toward the short hole H3 from the plate terminal 51c, and the short member 62 is installed or located at the short hole H3 to face the short protrusion 61. That is, the short protrusion 61 and the short member 62 correspond to the short hole H3, and face each other to maintain a separated state (a solid line state), and form a short state (an imaginary line state) by reversal of the short member 62 when internal pressure of the rechargeable battery 100 increases, so that current charged in the electrode assembly 30 may be discharged.

In the meantime, the plate terminal 51c of the cathode terminal 51 includes a first receiving recess G1 (e.g., receiving recesses G11 and G12) in a surface facing the insulator 70, and the insulator 70 includes a first wall B1 (e.g., walls B11 and B12) protruding toward the first receiving recess G1 to be inserted in the first receiving recess G1. The cap plate 40 includes a second receiving recess G2 in a surface facing the insulator 70, and the insulator 70 includes a second wall B2 protruding toward the second receiving recess G2 to be inserted in the second receiving recess G2.

The fluid receiving recess 71 induces and receives electrolyte fluid entering from the outside and discharges the electrolyte fluid through the outlet 72. In comparison, the first and second receiving recesses G1 and G2 and the first and second walls B1 and B2 increase the distance or length of a permeation path of the electrolyte fluid in order to reduce the permeation of the electrolyte fluid. The first receiving recess G1 and the first wall B1 increase the distance or length of the permeation path in an upper surface of the insulator 70, and the second receiving recess G2 and the second wall B2 increase the distance or length of the permeation path in a lower surface of the insulator 70.

The first receiving recess G1 includes an $11^{th}$ receiving recess G11 adjacent to an outer side of the rivet terminal 51a of the cathode terminal 51 and a $12^{th}$ receiving recess G12 adjacent to an outer side of the short protrusion 61. The first wall B1 includes an $11^{th}$ wall protruding so as to be coupled to the $11^{th}$ receiving recess G11, and a $12^{th}$ wall B12 protruding so as to be coupled to the $12^{th}$ receiving recess G12.

The $11^{th}$ receiving recess G11 and the $11^{th}$ wall B11 are coupled to each other to prevent or reduce the electrolyte fluid from permeating into the terminal hole H1. The $12^{th}$ receiving recess G12 and the $12^{th}$ wall B12 are coupled to each other to prevent or reduce the electrolyte fluid from permeating into the short hole H3.

The second receiving recess G2 and the second wall B2 are adjacent to the outer side of the rivet terminal 51a of the cathode terminal 51. Accordingly, the second receiving recess G2 and the second wall B2 are coupled with each other to prevent or reduce the electrolyte fluid from permeating into the terminal hole H1.

The terminal hole H1 at a side of the cathode terminal 51 forms a double electrolyte fluid blocking structure by the $11^{th}$ receiving recess G11 and the $11^{th}$ wall B11 in the upper surface of the insulator 70 and the second receiving recess G2 and the second wall B2 in the lower surface of the insulator 70. Accordingly, it is possible to more effectively prevent or reduce corrosion of the cathode terminal 51.

Hereinafter, a second exemplary embodiment of the present invention will be described. A description of the same configuration as that of the first exemplary embodiment will be omitted, and a different configuration will be described.

Figure 4:
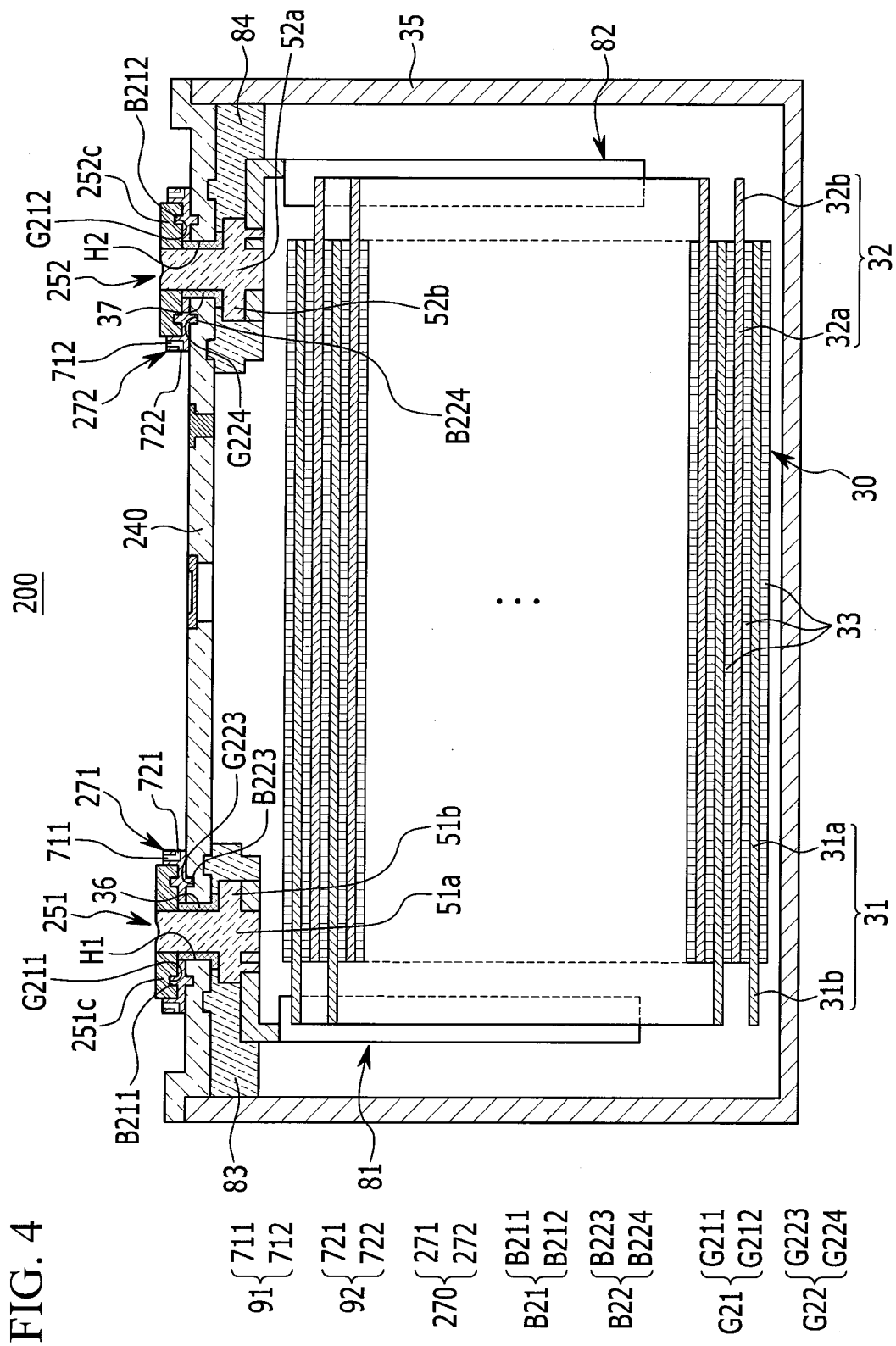
FIG. 4 is a schematic cross-sectional view of a rechargeable battery according to a second exemplary embodiment of the present invention.

FIG. 4 is a cross-sectional view of a rechargeable battery 200 according to the second exemplary embodiment of the present invention. In the rechargeable battery 200 of the second exemplary embodiment, a cathode terminal 251 and an anode terminal 252 are electrically insulated from the cap plate 240.

To this end, an insulator 270 includes a first insulator 271 located between the cathode terminal 251 and the cap plate 240 and a second insulator 272 located between the anode terminal 252 and the cap plate 240.

The first insulator 271 is located between a plate terminal 251c and the cap plate 240 at a side of the cathode terminal 251, and surrounds an outer side of the plate terminal 251c. The second insulator 272 is located between a plate terminal 252c and the cap plate 240 at a side of the anode terminal 252, and surrounds an outer side of the plate terminal 252c.

A fluid receiving recess 91 includes first and second fluid receiving recesses 711 and 712 formed at borders or along a periphery of the first and second insulators 271 and 272 surrounding outer sides of the plate terminals 251c and 252c of the cathode and anode terminals 251 and 252, respectively.

An outlet 92 includes first and second outlets 721 and 722 formed toward the outside at the first and second fluid receiving recesses 711 and 712, respectively, so as to discharge the fluid received in the fluid receiving recess 91 to the outside of the first and second insulators 271 and 272.

The first receiving recess G21 includes $21^{st}$ and $22^{nd}$ receiving recesses G211 and G212 formed in a surface of the plate terminals 251c and 252c of the cathode and anode terminals 251 and 252 facing toward the first and second insulators 271 and 272. A first wall B21 includes $21^{st}$ and $22^{nd}$ walls B211 and B212 formed in the first and second insulators 271 and 272 to be inserted in the $21^{st}$ and $22^{nd}$ receiving recesses G211 and G212.

The second receiving recess G22 includes $23^{rd}$ and $24^{th}$ receiving recesses G223 and G224 formed in a surface of the cap plate 240 facing toward the first and second insulators 271 and 272. The second wall B22 includes $23^{rd}$ and $24^{th}$ walls B223 and B224 formed in the first and second insulators 271 and 272 in opposite sides of the $21^{st}$ and $22^{nd}$ walls B211 and the B212 to be inserted in the $23^{rd}$ and $24^{th}$ receiving recesses G223 and G224.

The coupling structures of the $21^{st}$ and $22^{nd}$ walls B211 and B212 and the $21^{st}$ and $22^{nd}$ receiving recesses G211 and G212 block or reduce the electrolyte fluid from permeating from the outsides of the first and second insulators 271 and 272. The coupling structures of the $23^{rd}$ and $24^{th}$ walls B223 and B224 and the $23^{rd}$ and $24^{th}$ receiving recesses G223 and G224 block or reduce the electrolyte fluid from permeating from the insides of the first and second insulators 271 and 272.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

DESCRIPTION OF SOME OF THE REFERENCE SYMBOLS

| | |
|---|---|
| 30: Electrode assembly | 31: First electrode (cathode) |
| 31a, 32a: Coated portion | 31b, 32b: Uncoated portion |
| 32: Second electrode (anode) | 33: Separator |
| 35: Case | 36, 37: Cathode and anode gaskets |
| 40, 240: Cap plate | 44: Vent hole |
| 45: Vent plate | 47: Sealing stopper |
| 49: Electrolyte injection opening | |
| 51, 251: First electrode terminal (cathode terminal) | |
| 51a, 52a: Rivet terminal | 51b, 52b: Flange |
| 52, 252: Second electrode terminal (anode terminal) | |
| 51c, 52c, 251c, 252c: Plate terminal | |
| 52d: Top plate | 60: External short part |
| 61: Short protrusion | 62: Short member |
| 70, 270: Insulator | 71, 91: Fluid receiving recess |
| 72, 92: Outlet | 81, 82: Cathode and anode lead tabs |
| 83, 84: Cathode and anode insulating members | |
| 100, 200: Rechargeable battery | 271, 272: First and second insulators |
| 711, 712: First and second fluid receiving recesses | |
| 721: First outlet | 722: Second outlet |
| B1, B2: First and second walls | B11, B12: $11^{th}$ and $12^{th}$ walls |
| B211, B212: $21^{st}$ and $22^{nd}$ walls | B223, B224: $23^{rd}$ and $24^{th}$ walls |
| G1, G21: First receiving recess | G11, G12: $11^{th}$ and $12^{th}$ receiving recesses |
| G2, G22: Second receiving recess | G211, G212: $21^{st}$ and $22^{nd}$ receiving recesses |
| G223, G224: $23^{rd}$ and $24^{th}$ receiving recesses | |
| H1, H2: Terminal hole | H3: Short hole |

What is claimed is:

1. A rechargeable battery, comprising:
   an electrode assembly configured to perform charging and discharging;
   a case enclosing the electrode assembly;
   a cap plate coupled to an opening of the case;
   an electrode terminal engaging a terminal hole of the cap plate; and
   an insulator between the cap plate and the electrode terminal,
   wherein the insulator comprises:
      a fluid receiving recess at a side of the electrode terminal to receive fluid, and
      an outlet extending through the insulator from the fluid receiving recess to discharge the received fluid,
   wherein:
   the electrode terminal comprises:
   a rivet terminal in the terminal hole; and
   a plate terminal coupled to the rivet terminal and at an external surface of the cap plate, and the insulator is between the plate terminal and the cap plate, and surrounds a periphery of the plate terminal.

2. The rechargeable battery of claim 1, wherein:
the fluid receiving recess
is adjacent to a periphery of the electrode terminal, and
the outlet comprises first and second outlets at opposing ends of the cap plate in a longitudinal direction of the cap plate.

3. The rechargeable battery of claim 1, wherein:
the fluid receiving recess is around a periphery of the plate terminal.

4. The rechargeable battery of claim 1, wherein:
the plate terminal comprises
a first receiving recess in a surface facing the insulator, and
the insulator comprises
a first wall in the first receiving recess.

5. The rechargeable battery of claim 4, wherein:
the cap plate comprises
a second receiving recess in a surface facing the insulator, and
the insulator comprises a second wall in the second receiving recess.

6. The rechargeable battery of claim 5, wherein:
the electrode terminal comprises a cathode terminal and an anode terminal,
the anode terminal is electrically coupled to the cap plate, and
the cathode terminal and the cap plate further comprise an external short part therebetween.

7. The rechargeable battery of claim 6, wherein:
the external short part comprises:
a short protrusion extending from the plate terminal and facing a short hole at the cap plate; and
a short member at the short hole.

8. The rechargeable battery of claim 7, wherein:
the first receiving recess comprises:
a third receiving recess adjacent to a rivet terminal of the cathode terminal; and
a fourth receiving recess adjacent to the short protrusion.

9. The rechargeable battery of claim 8, wherein:
the first wall comprises:
a first wall coupled to the third receiving recess; and
a second wall coupled to the fourth receiving recess.

10. The rechargeable battery of claim 6, wherein:
the second receiving recess and the second wall are adjacent to the rivet terminal of the cathode terminal.

11. The rechargeable battery of claim 5, wherein:
the electrode terminal comprises a cathode terminal and an anode terminal, and
the insulator comprises:
a first insulator between the cathode terminal and the cap plate, and surrounding a periphery of a plate terminal of the cathode terminal; and
a second insulator between the anode terminal and the cap plate, and surrounding a periphery of a plate terminal of the anode terminal.

12. The rechargeable battery of claim 11, wherein:
the fluid receiving recess comprises:
a first fluid receiving recess around a periphery of the plate terminal of the cathode terminal; and
a second fluid receiving recess around a periphery of the plate terminal of the anode terminal.

13. The rechargeable battery of claim 11, wherein:
the first receiving recess comprises:
a third receiving recess at a surface of the plate terminal of the cathode terminal facing the first insulator; and
a fourth receiving recess at a surface of the plate terminal of the anode terminal facing the second insulator.

14. The rechargeable battery of claim 13, wherein:
the first wall comprises:
a first wall of the first insulator in the third receiving recess; and
a second wall of the second insulator in the fourth receiving recess.

15. The rechargeable battery of claim 14, wherein:
the second receiving recess comprises:
a fifth receiving recess in a surface of the cap plate facing the first insulator; and
a sixth receiving recess in a surface of the cap plate facing the second insulator.

16. The rechargeable battery of claim 15, wherein:
the second wall comprises:
a third wall of the first insulator in the fifth receiving recess; and
a fourth wall of the second insulator in the sixth receiving recess.

* * * * *